(12) United States Patent
Thies et al.

(10) Patent No.: US 10,053,482 B2
(45) Date of Patent: Aug. 21, 2018

(54) SOLVENT AND RECOVERY PROCESS FOR LIGNIN

(71) Applicant: Clemson University, Clemson, SC (US)

(72) Inventors: Mark C. Thies, Clemson, SC (US); Adam S. Klett, Seneca, SC (US); David A. Bruce, Central, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 14/945,846

(22) Filed: Nov. 19, 2015

(65) Prior Publication Data

US 2016/0137680 A1    May 19, 2016

Related U.S. Application Data

(60) Provisional application No. 62/081,814, filed on Nov. 19, 2014.

(51) Int. Cl.
*C07G 1/00* (2011.01)
*B01D 11/00* (2006.01)

(52) U.S. Cl.
CPC ........... *C07G 1/00* (2013.01); *B01D 11/00* (2013.01)

(58) Field of Classification Search
CPC . C07G 1/00; B01D 11/00; C08H 6/00; C08H 8/00; C08L 97/005
See application file for complete search history.

(56) References Cited

U.S. PATENT DOCUMENTS

| 5,730,837 A * | 3/1998 | Black ................ D21C 3/20 127/37 |
|---|---|---|
| 2011/0294991 A1 | 12/2011 | Lake et al. |
| 2014/0121359 A1 | 5/2014 | Thies et al. |
| 2014/0200334 A1 | 7/2014 | Lake et al. |
| 2016/0017541 A1 | 1/2016 | Lake |

OTHER PUBLICATIONS

Kubo, S., Y. Uraki, and Y. Sano. "Preparation of carbon fibers from softwood lignin by atmospheric acetic acid pulping." Carbon 36.7 (1998): 1119-1124.*

(Continued)

*Primary Examiner* — Nicholas E Hill
(74) *Attorney, Agent, or Firm* — Dority & Manning, P.A.

(57) ABSTRACT

Methods for obtaining purified lignin and the lignin that can be obtained by the methods are described. Methods include processing pretreated lignocellulosic biomass feedstock to recover the lignin and provide a lignin composition with a very low level of impurities such as metals and ash. In addition, the lignin recovered from the process can have a narrow molecular weight distribution and, depending upon the specific stages utilized in the process, can have a predetermined molecular weight. The process includes one or more separation stages in which a lignin-containing feedstock is mixed with a solvent solution. The mixture fractionates to form a solvent-rich liquid phase and a lignin-rich liquid phase, the lignin being partitioned across the phases according to the molecular weight of the lignin. Furthermore, the metal salts of the pretreated lignocellulosic biomass feedstock also partition across the phases.

11 Claims, 4 Drawing Sheets

(56) References Cited

OTHER PUBLICATIONS

Lachenal, Dominique, et al. "Isolation of residual lignin from softwood kraft pulp. Advantages of the acetic acid acidolysis method." Comptes Rendus Biologies 327.9 (2004): 911-916.*
Sluiter, A., et al., "Determination of ash in biomass," Technical report NREL/TP-510-42622, issue date Jul. 17, 2005.*
Zhao, Xuebing, and Dehua Liu. "Chemical and thermal characteristics of lignins isolated from Siam weed stem by acetic acid and formic acid delignification." Industrial Crops and Products 32.3 (2010): 284-291.*
Lundquist, Knut, Brita Ohlsson, and Rune Simonson. "Isolation of lignin by means of liquid-liquid extraction." Svensk Papperstidning 80.5 (1977): 143-144.*
Zlokarnik, M., "Stirring," Ullmann's Encyclopedia of Industrial Chemistry, published online 2003, vol. 34, pp. 433-471.*
Kubo, Satoshi, and John F. Kadla. "Poly (ethylene oxide)/organosolv lignin blends: Relationship between thermal properties, chemical structure, and blend behavior." Macromolecules 37.18 (2004): 6904-6911.*
Xin, Qin, et al. "Extraction of lignins from aqueous-ionic liquid mixtures by organic solvents." Biotechnology and bioengineering 109.2 (2012): 346-352.*
Muller, E., et al. "Liquid-Liquid Extraction." Ullmann's Encyclopedia of Industrial Chemistry, published online 2008, vol. 21, 249-307.*
Zhang, et al.; "*Polymer Precursor-Derived Carbon*" ACS Symposium Series, vol. 1173, Oct. 14, 2014; pp. Chapter 6, 137-152 [DOI: 10.1021/bk-2014/1173].
Chatterjee, et al.; "*Polymer Precursor-Derived Carbon*" ACS Symposium Series, vol. 1173, Oct. 14, 2014; pp. Chapter 7, 153-168 [DOI: 10.1021/bk-2014/1173].
Arato, et al.; "The lignol approach to biorefining of woody biomass to produce ethanol and chemicals," *Appl Biochem Biotechnology*, (2005) 123, pp. 871-882.
Baker, et al.; "Rapid manufacture of low cost carbon fiber from thermally engineered organic-purified lignin," *Presented at Clemson University*, Clemson, SC, USA, Jan. 11, 2012 (3 pages).
Baker, et al.; "Recent Advances in Low-Cost Carbon Fiber Manufacture from Lignin," *J Appl Polym Sci*.(2013) 130, pp. 713-728.
Baker, F.S.; "Utilization of Sustainable Resources for Production of Carbon-Fiber Materials for Structures and Energy-Efficient Applications," *Proceedings of the Nordic Wood Biorefinery Conference*, Stockholm, Sweden, Mar. 2011; (55 pages).
Chawla, K.K.; "Composite Materials: Science and Engineering," Textbook-*Springer:Berlin*, (1998) pp. 137-195.

Compere, et al., "Low Cost Carbon Fibers From Renewable Resources," *Adv Affordable Mat Technol*, [Online] (2001) ww.ornl.gov/~webworks/cppr/y2001/pres/111380.pdr (10 pages).
Gellerstedt, et al.; "The Wood-Based Biorefinary: A source of Carbon Fiber?" *The Open Argic J.* (2010) 3, pp. 119-124.
Gosselink, et al.; "Co-ordination network for lignin-standardization, production and applications adapted to market requirements (Eurolignin)," *Ind Crop Prod*, (2004) 20, pp. 121-129.
Green, et al.; "Liquid-liquid and other liquid-liquid operations and equipment," *Perr's chemical engineer' handbook*, 8th ed.; McGraw-Hill:New York, 2008, 15-23.
Hasegawa, et al; "New pretreatment methods combining a hot water and water/acetone extraction for thermo-chemical conversion of biomass," *Energy and Fuels*, (2004) 18, pp. 755-760.
Holladay, et al.; "Top value-added chemicals from biomass," *Pacific Northwest National Laboratory*, (2007), 2, pp. 22-25.
Jeon, et al.; "Carbon Fibers, Handbook of Advanced Ceramics: Materials, Applications, Processing, and Properties," *Academic Press, Elsevier Inc.* (2013) Chapters 2-8. [ see website: https://books.google.com/books/about/Handbook_of_Advanced_Ceramics.html?id=tdx71S4fO9C&printsec=frontcover&source=kp_read_button&hl=en#v=onepage&q&f=false ].
Klett, et al.; "Phase Behavior of Kraft lignin with tunable, renewable solvent systems," *Proceedings of the Annual Meeting of the American Institute of Chemical Engineers*, Atlanta, USA, Nov. 2014, Paper 614f (1 pages—abst.)
Klett, et al,; "Recovering ultraclean lignins of controlled molecular weight from Kraft black liquor lignins," *Chem. Commun.*, (2015) 51, pp. 12855-12858.
Kouisni, et al.; "The Lignoforce System™: A new process for the production of high-quality lignin from black liquor." *Journal of Science & Technology for Forest Products and Processes.* (2012) 2, pp. 6-10.
Lux Research; "Lignin-derived chemicals to hit market in 2021," *Biomass Magazine* [Online] (2014); http://bionmassmagazine.com/articles/10662/lux-research-lignin-derived-chemicals-to-hit-market-in-2021 (accessed Oct. 2015), (1 page).
Ni, et al.; "Lignin solubility in ethanol-water mixtures," *J. App. Polym. Sci.* (1995) 57, pp. 1441-1446.
Pan, et al.; "Effect of replacing polyol by organosolv and kraft lignin on the property and structure of rigid polyurethane foam," *Biotechnology for Biofuels*, (2013) 6, pp. 12-22.
Pan, et al.; "Organosolv ethanol lignin from hybrid poplar as a radical scavenger: Relationship between lignin structure, extraction conditions, and antioxidant activity," *J. Agric. Food Chem.*, (2006) 54, pp. 5806-5813.
Reisch, M.S.; "Getting the steel out: Automakers push ahead on energy-saving carbon fiber composites despite questions of economic viability," *Chem. and Engineering News* (2011) 89, pp. 10-14.
Tomani, P.; "The Lignoboost Process," *Cellul. Chem. and Technol.*, (2010) 44, pp. 53-58.

\* cited by examiner

SOLVENT AND RECOVERY PROCESS FOR LIGNIN

CROSS REFERENCE TO RELATED APPLICATION

This application claims filing benefit of U.S. Provisional patent application Ser. No. 62/081,814, Confirmation No. 2093, having a filing date of Nov. 19, 2014, which is incorporated herein by reference.

GOVERNMENT SUPPORT CLAUSE

This invention was made with government support under Award No. CBET-1403873 under grant no. CMMI-1462804 both awarded by National Science Foundation. The government has certain rights in the invention.

BACKGROUND

The efficient use of natural resources is desirable for economic, ecological and political reasons. Through improved use of renewable resources, we can extend the existence of our non-renewable resources and generate less waste in both production of goods and disposal of goods through recycling of "green" materials. Lignocellulosic biomass is a most readily available renewable natural resource and provides the two most abundant organic compounds on earth in lignin and cellulose, with the other major components including hemicellulose. The usefulness of cellulose has long been recognized, primarily in paper making, but the possibilities of lignin development have only recently begun to be realized. Lignin is a generic term for a complex polymer of aromatic alcohols that varies somewhat between plant species. It is an integral part of the cell wall that covers and protects the cellulose and hemicellulose and presents many challenges to the successful recovery of the biomass components. In order to successfully utilize the components of lignocellulosic biomass, the individual components must first be separated and recovered through pretreatment.

Treatment of lignocellulosic biomass (for instance, wood) via the kraft (or sulfate) process has long been carried out with the primary aim of separating the cellulose in the form of pulp for use in paper formation, in forming derivative polymeric products such as cellophane and rayon, and more recently in the formation of biofuels. The other components of the lignocellulosic biomass (lignin, hemicellulose, etc.) are separated as by-products in the alkaline pulping liquor, called black liquor in the kraft process. The black liquor has historically been recovered so that the sodium and sulfur within can be recovered and used to regenerate the catalysts (sodium hydroxide and sodium sulfide) required in the pulp-making process. Of equal importance, the black liquor is used as an energy source in the kraft process. This recovery process is highly efficient, but provides little in the way of additional value-added products. Other pretreatment processes for obtaining cellulosic pulp from a lignocellulosic biomass, such as the soda and sulfite processes, can also be used to separate the cellulose from the hemicellulose and lignin by-products that remain in an alkaline liquor.

The lignin component of lignocellulosic biomass presents great possibilities for the development of value-added products, as it is unique among renewable biopolymers in having a significant aromatic character and high energy density. For instance, lignin presents possibilities as a green replacement for fossil fuels to provide raw materials for the formation of polymers and other chemicals as well as biofuels and other chemical applications.

Unfortunately, current methods for recovering lignin from lignocellulosic biomass either are prohibitively expensive or provide a product that is too high in impurities to be useful for processing into many value-added products. For instance, the alkaline liquor stream from pulp formation processes represents a huge potential source of lignin (approximately 50 million tons per year), but includes a very high content of ash and metals (mainly sodium and potassium). Other separation and purification methods have been developed to treat lignocellulosic biomass, including acidic treatment (sulfuric acid, oxalic acid, peracetic acid, acetic acid), alkaline treatment (sodium, potassium, calcium, and ammonium hydroxides), organosolv treatment (ethanol, methanol, acetone, or ethylene glycol in combination with water), oxidative delignification (hydrogen peroxide, ozone, oxygen or air), biological methods (cellulolytic organisms such as filamentous fungi), and microwave irradiation. Unfortunately, these methods are either prohibitively expensive, presenting serious issues with regard to scale-up, and/or they provide a lignin product with less-than-desirable physical properties or an unacceptably high impurities content. For instance, even upon further treatment of black liquor by use of a lignin purification process, the metals content of the purified lignin thus produced will generally be greater than 2000 parts per million (ppm) and the ash content will be 1-4% or more, both of which are too high for successful downstream utilization of the lignin for high-value applications. Even those very expensive processes that are able to produce a high-purity lignin, such as organosolv processing, cannot be used to isolate a lignin fraction whose molecular weight is both well-defined and controllable, which would be of great benefit for the further development of lignin-based products.

What is needed in the art is a lignin recovery method that can provide a high-purity lignin with a well-defined, controlled molecular weight in an efficient, economical fashion.

SUMMARY

According to one embodiment, disclosed is a method for recovering lignin from a lignocellulosic biomass. More specifically, a method can include combining a lignocellulosic biomass with a solvent solution to form a mixture. Following combination of the lignocellulosic biomass with the solvent solution, the lignin can solvate into the solvent solution and the mixture can separate into a first fraction and a second fraction, with the first fraction including a solvent-rich liquid phase and the second fraction including a lignin-rich liquid phase. The first fraction can include a first portion of the lignin and the second fraction can include a second portion of the lignin, with the lignin of the two fractions differing from one another in at least some aspect. For instance, the average of the number average molecular weights of the lignin in the first and second fractions can differ. Furthermore, the metals content of the first fraction can differ from the metals content of the second fraction. The method can also include recovering the lignin of the first fraction and/or the lignin of the second fraction.

Also disclosed is purified lignin with a well-defined molecular weight. For instance a purified lignin can have an average molecular weight and a molecular weight distribution in which about 40 wt. % or more of the lignin is within about 50% or less of the number average molecular weight of the sample as determined by gel permeation chromatography.

According to another embodiment, a purified lignin is disclosed having a polydispersity index of about 2 or less as determined by gel permeation chromatography.

BRIEF DESCRIPTION OF THE FIGURES

The present disclosure may be better understood with reference to the figures including.

Figure 1:
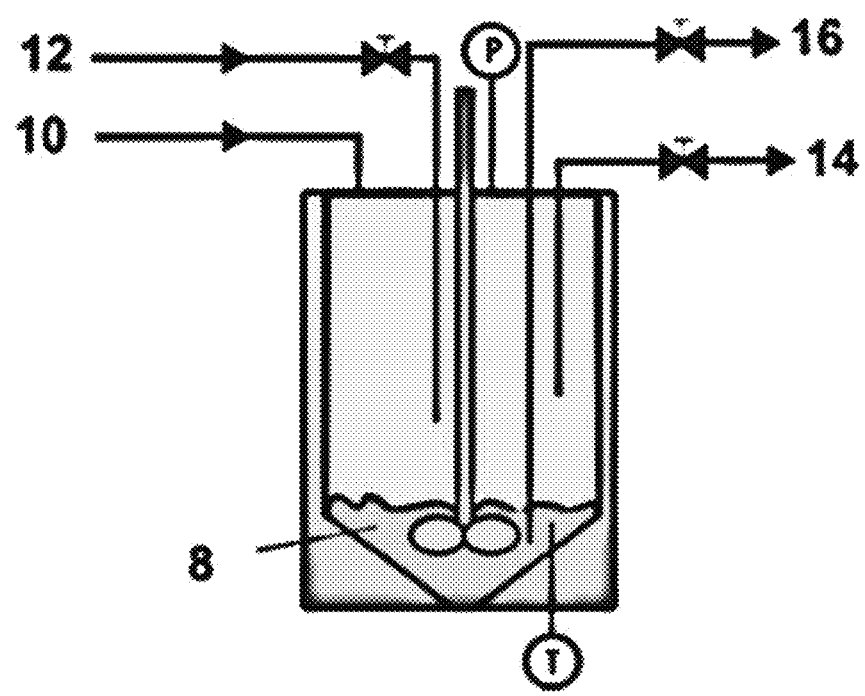
FIG. 1 illustrates a single stage of a recovery process.

Repeat use of reference characters in the present specification and drawings is intended to represent the same or analogous features or elements of the present disclosure.

DETAILED DESCRIPTION

Reference will now be made in detail to various embodiments of the disclosed subject matter, one or more examples of which are illustrated in the accompanying drawings. Each example is provided by way of explanation of the subject matter, not limitation thereof. In fact, it will be apparent to those skilled in the art that various modifications and variations can be made in the present disclosure without departing from the scope or spirit of the subject matter. For instance, features illustrated or described as part of one embodiment can be used in another embodiment to yield a still further embodiment.

The present disclosure relates generally to methods for obtaining purified lignin and purified lignin that can be obtained by the methods. More specifically, the disclosed methods provide a route for processing lignocellulosic biomass to recover lignin. For instance, lignin can be recovered with a very low level of impurities such as metals and ash. In one embodiment, the lignin recovered via the process can have a narrow molecular weight distribution and, through variation in the number of stages and characteristics of each stage utilized in a process, the recovered lignin can have a predetermined molecular weight with a narrow molecular weight distribution. For instance, a high, mid-range, or low molecular weight lignin can be obtained and/or an ultra-pure lignin can be obtained that can be utilized as a base material in the formation of other value-added polymers and/or non-polymeric chemicals.

As utilized herein, high molecular weight lignin can generally be considered as having a number average molecular weight of about 10,000 or greater, a mid-range molecular weight lignin can have a number average molecular weight of from about 5,000 to about 10,000, a low molecular weight lignin can have a number average molecular weight of from about 1,000 to about 5,000, and a very low molecular weight lignin can have a number average molecular weight of less than about 1,000. Number average molecular weights can be determined according to a gel permeation chromatography (GPC) analysis calibrated with monodisperse poly(ethylene glycol)/poly(ethylene oxide) molecular standards (Part No. PL2080-0201, Agilent). For example, the GPC setup can use a Styragel HT4 (Waters) column followed by a Polar Gel L (Agilent) column, the mobile phase can be dimethylformamide (DMF)+0.05M lithium bromide at a flow rate of 1 mL/min, and UV detection can be at 280 nm.

The narrow weight distribution of the purified lignin that can be obtained according to the disclosed methods can be defined in one embodiment by the average molecular weight of the lignin. For instance, a purified lignin can have about 40 wt. % or more, about 50 wt. % or more, about 60 wt. % or more, about 70 wt. % or more, or about 80 wt. % or more of the lignin fall within about 50% or less, about 40% or less, about 30% or less, about 20% or less, or about 10% or less of the average of the number average molecular weight of the lignin sample. For example, a recovered high molecular weight lignin fraction can be one in which about 80 wt. % or more of the lignin is a high molecular weight lignin, i.e., having a number average molecular weight of about 10,000 or more. In another example, a purified lignin can be a lignin in which about 40 wt. % or more of the lignin of the sample is within about 50% of a targeted number average molecular weight as determined by GPC analysis.

In another embodiment, the narrow weight distribution of the purified lignin obtained according to the disclosed methods can be defined by the polydispersity index of the sample. For instance, a purified lignin can have a polydispersity index of about 3 or less, about 2.5 or less, about 2 or less, about 1.5 or less, or about 1.25 or less in some embodiments. Polydispersity index can be determined according to gel permeation chromatography, for instance as described further herein.

The disclosed methods incorporate a solvent solution that can solvate the lignin in a feedstock and maintain the lignin as a liquid through the separation process. As such, the lignin can be recovered either as a solvate in a liquid as directly obtained from a separation stage of a process or alternatively as a solid, for instance following precipitation and/or solvent removal from the liquid.

The ability to recover the lignin of a fraction as a solvate in a liquid may be of benefit in downstream processing. For example, in the past, high molecular weight lignin has proven difficult for further development due to the nature of the highly branched, aromatic polymer. The solvent solutions and separation methods disclosed herein can solvate high molecular weight lignin and as such can provide a high molecular weight lignin in a liquid form that can be processed according to liquid-based technology, e.g., solution spinning to form polymeric fibers. Of course, the lower molecular weight fractions of lignin can also be processed in the liquid form (e.g., by melt spinning to form polymeric fibers) or following separation of a solid lignin product from the liquid, as desired.

The lignin recovery process utilizes one or more separation stages within which a lignin-containing feed is combined with a solvent solution. Upon combination and optional heating, the mixture including the solvated lignin in the solvent solution separates to form a first solvent-rich liquid phase in a first fraction and a second lignin-rich liquid phase in a second fraction. As utilized herein, a solvent-rich liquid phase refers to a separation phase formed in a separation process having a greater solvent:lignin ratio as compared to the lignin-rich liquid phase of that separation process. Conversely, a lignin-rich liquid phase refers to a separation phase formed in a separation process having a greater lignin:solvent ratio as compared to the solvent-rich liquid phase of that separation process.

FIG. 1 illustrates a separation stage of a recovery process. As can be seen, the separation stage includes feeding a lignin-containing feedstock 10 and a solvent solution 12 into a separation vessel 8. The lignin-containing feedstock 10 includes a lignocellulosic biomass derived from a source material. The process can be utilized with any lignocellulosic biomass source material including both woody and non-woody sources. Woody lignocellulosic biomass can be sourced from forests, agriculture, or any other source and can encompass hardwood and/or softwood source materials. For example, fast-growing tree species such as hybrid willow (Salix) and poplar as have been developed for production in agricultural settings can be utilized.

Agriculture systems can be a source of non-woody lignocellulosic biomass source materials. Agricultural systems can produce several different types of non-woody lignocellulosic biomass materials including primarily cellulosic materials such as plant leaves and higher lignin-content materials such as stems and stalks. For example, harvesting of cereals, vegetables, and fruits can provide lignocellulosic biomass source materials. Agricultural residues including field residues and processing residues can provide lignocellulosic source materials. Field residues include materials left in an agricultural field after harvesting the crop, and can include, without limitation, straw and stalks, leaves, and seed pods. Processing residues, such as husks, seeds, bagasse and roots, include those materials left after the processing of the crop into a desired form. Examples of agricultural residue source materials can include, without limitation, rice straw, wheat straw, corn stover, and sugarcane bagasse.

Other waste streams such as municipal waste, industrial waste, construction waste, sawmill waste, etc., can provide a lignocellulosic biomass source material. For instance, yard waste, holiday waste, etc. can provide a lignocellulosic source material in some embodiments.

Perennial and annual grasses can provide lignocellulosic source materials. Examples of grass source materials can include, without limitation, switchgrass (*Panicum virgatum*), miscanthus (*Miscanthus* spp. *Anderss.*), canary grass (*Phalaris arundinacea*), giant reed (*Arundo donax* L.), alfalfa (*Medicago sativa* L.), sorghum (*Sorghum bicolor*) and Napier grass (*Pennisetum purpureum*).

Referring again to FIG. 1, the lignin-containing feedstock 10 can include a lignocellulosic biomass derived from a source material. For instance, the lignocellulosic biomass of the feedstock can be derived from a source material through one or more pretreatment processes. In one embodiment, the feedstock 10 can include lignin that has been previously separated from other components of a lignocellulosic biomass source material, and the cohesive structure of the natural biomass source material can have been altered and/or damaged by the pretreatment. The feedstock can include other components of a lignocellulosic biomass source material in combination with the lignin. However, one or more other components of a lignocellulosic biomass source material may have been removed from the source material or altered as compared to the original source material during one or more pretreatment processes. In one embodiment, the feedstock for a process (e.g., the feed to an initial stage) can include a pretreated lignocellulosic biomass that can include lignin in an amount of about 30% by weight or greater, about 40% by weight or greater, or about 50% by weight or greater, in some embodiments. Processes are not limited to high lignin-content feedstocks, however, and in other embodiments the feedstock can include lignin in an amount of about 30% or less.

The pretreatment processes as can be used are not particularly limited. In one embodiment, the lignin can be kraft lignin obtained by a kraft pulping process, and the black liquor stream of the kraft process can provide the lignocellulosic biomass feedstock. A black liquor obtained from a kraft process can be further treated prior to the disclosed purification process. For instance, a pretreatment that can include precipitation of a portion of the black liquor can be carried out. In such an embodiment, the precipitate can include a lignocellulosic biomass that can then be further treated according to the disclosed methods. Such a black liquor precipitation process can separate a portion of the impurities contained in the black liquor such as ash, metals, hemicellulose, etc., from the lignocellulosic biomass to be used as feedstock for the disclosed process. For example, a black liquor may be subjected to carbon dioxide and/or sulfuric acid acidification to precipitate out a lignocellulosic biomass comprising lignin, leaving impurities behind in the remaining liquor portion. Of course, such a precipitation pretreatment is not limited to black liquor source materials. In another embodiment, an alkaline liquor obtained from processing of a source material such as an agricultural residue (e.g., corn stover) can be pretreated via acidification with an inorganic or organic acid, which can precipitate out a lignin-containing lignocellulosic biomass feedstock, leaving impurities behind in the remaining alkaline liquor.

Pretreatment operations that can be carried out prior to feeding the lignocellulosic biomass feedstock to a separation process are not limited to kraft processing and can include any chemical, physical, or biological lignocellulosic biomass pretreatment or combination thereof. Lignocellulosic biomass source material or a source material product or byproduct can be treated according to any methodology generally known in the art. Examples of separation and purification methods that can be utilized to pretreat lignocellulosic biomass can include, without limitation, acidic treatment, alkaline treatment, organosolv treatment, oxidative delignification, biological methods, and microwave irradiation. In one embodiment, the lignin feedstock can be treated prior to separation as disclosed herein by use of treatment processes as described by Lake, et al. (U.S. Patent Application Publication No. 2011/0294991), which is incorporated by reference. According to this treatment, a liquid-lignin feedstock can be precipitated by reduction of the pH of an alkaline liquor stream via countercurrent reaction with carbon dioxide at elevated temperature and pressure, which can remove a significant amount of the impurities from the initial liquor stream. In another embodiment described by Thies, et al. (U.S. Published Patent Application No. 2014/0121359, incorporated herein by reference), a carbon dioxide pretreatment can be carried out with an alkaline liquor feed (e.g., a black liquor) so as to cause decremental reduction in the pH of the liquor and produce multiple fractions of dense liquid-lignin precipitate, which can provide a lignin-containing lignocellulosic biomass feedstock for the subject purification process with a narrower molecular weight range as compared to that of the original alkaline liquor. Other pretreatment processes that can be carried out prior to the disclosed processes can include, without limitation, those described in U.S. Pat. No. 4,908,098 to DeLong, et al., U.S. Pat. No. 6,022,419 to Torget, et al., U.S. Pat. No. 8,657,960 to North, et al., U.S. Pat. No. 8,663,392 to Zhang, et al., and U.S. Patent Application Publication No. 2014/0163210, all of which are incorporated herein by reference. A single pretreatment process can be carried out or multiple processes, as desired. For instance, in one embodiment, lignocellulosic biomass can be acidified following a first treatment process and prior to the separation/purification process as disclosed herein.

The lignin feedstock can be separated from other components of the feedstock according to the presently disclosed process such that lignins of the different fractions of a stage differ from one another according to some aspect. For instance, the lignins of different fractions can differ from one another according to, and without limitation, level of one or more metal impurities, level of ash impurity, molecular weight distribution, polydispersity index, or combinations of characteristics. For instance, depending upon the nature of the feedstock, an impurity level differential between separated fractions may be quite small or even nonexistent, as the feedstock may have been previously treated to provide a very low level of impurities (as with an organosolv pretreatment process), and the purification process may be carried out primarily to separate the lignin of the feedstock according to molecular weight. Alternatively, the lignin-containing feedstock may have a higher level of one or more impurities, but have been previously treated to provide a narrow molecular weight range (as with the decremental pH reduction process of Thies, et al.). In this embodiment, fractions of a separation stage can differ primarily according to the relative amounts of impurities in the different fractions.

When utilizing the separation/purification process for the removal of impurities from one or more fractions, the impurities targeted can include natural impurities (e.g., non-lignin components of a lignocellulosic biomass source material) and/or impurities due to the pretreatment process (es) carried out on the lignocellulosic biomass source material prior to the separation process. Impurities of a feedstock can include, for example, about 0.5 wt. % or more, about 2 wt. % or more, about 5 wt. % or more, or about 10 wt. % or more or even higher levels of ash and/or about 500 ppm or more, about 2000 ppm or more, about 8000 ppm or more, or even higher levels of metals (e.g., a combination of sodium and potassium). Of course, the feedstock is not limited to any particular level of impurities, and examples are provided merely for the sake of description of possible embodiments encompassed herein Referring again to FIG. 1, the lignin-containing feedstock 10 (e.g., a pretreated lignocellulosic biomass) can be combined with a solvent solution 12. The solvent solution can include water, one or more organic solvents, one or more inorganic acids, or combinations thereof. Organic solvents can include $C_1$ to $C_8$, e.g., $C_1$ to $C_4$, organic solvents that have at least one functional group in common with lignin such as, and without limitation, organic acids, aliphatic alcohols, ethers, ketones and mixtures thereof. Organic acids as may be utilized can encompass for example, formic acid, acetic acid, propanoic acid, butanoic acid, oxalic acid, etc., or mixtures thereof.

When considering a solvent solution that includes a mixture of different solvents (e.g., a mixture of water and an organic solvent) the relative proportions of the solvents are not particularly limited, with the preferred ratio for any particular application generally depending upon the desired molecular weight, purity and yield of the lignin to be obtained from the process. For instance, the amount of any one of the water, organic solvent, or inorganic acid in a solvent solution can be from 0% by weight of the solvent solution to about 100% of the solvent solution, from about 20% by weight of the solvent solution to about 80% by weight of the solvent solution in some embodiments, from about 30% by weight of the solvent solution to about 70% by weight of the solvent solution in some embodiments, or about 50% by weight of the solvent solution in some embodiments.

The relative proportion of lignin to solvent solution provided to the separation stage is also not particularly limited. For instance, the combined mixture of the lignin-containing feedstock and solvent solution can include about 60% lignin by weight or less, about 45% lignin by weight or less, about 30% lignin by weight or less, about 20% lignin by weight or less, or about 10% lignin by weight or less in some embodiments. In other embodiments, however, the combined mixture of the lignin-containing feedstock and the solvent can include higher levels of lignin. There is no particular minimal limit to the amount of lignin included in a single separation stage, though economically speaking there should be a suitable amount so as to make the process feasible. For instance, the combined mixture of the lignin-containing feedstock and the solvent solution to a single separation stage can conceivably include about 1% or less by weight of lignin, though in general, the mixture can include about 1% or more by weight, such as about 5% or more by weight, in order to be economically feasible for a large-scale operation. In addition, the lignin-containing feedstock can be initially provided to the process as a solid that is a product or a pretreatment process, but this also is not a requirement of the process.

Figure 4:
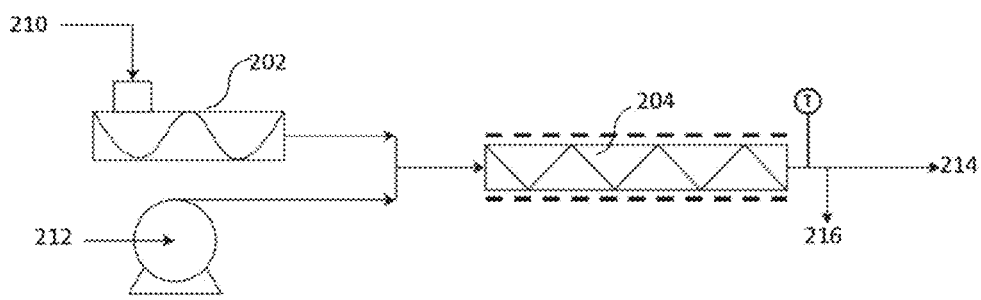
FIG. 4 is a flow diagram that uses a static mixer in a lignin recovery process.

Upon combination, the mixture including the lignin-containing feedstock and the solvent solution can be stirred or mixed by any device as is generally known in the art, such as a simple stirrer in a vessel or by use of a static mixer. By way of example, FIG. 4 illustrates a continuous system including a static mixer in which a lignocellulosic biomass feedstock 210 (e.g., a slurry containing about 40% to about 60% by weight water) is pumped, e.g., by a progressive cavity pump 202, and combined with a solvent solution 212. The two can be mixed in a static mixer 204, optionally in conjunction with heating, upon which the mixture can fractionate to form a solvent-rich phase 214 and a lignin-rich phase 216, as shown.

If desired, the mixture can be treated under increased pressure to prevent vaporization of the components, though typically conditions can be maintained such that increased pressure is not required. Upon combination, the lignin of the feedstock can solvate into the solvent solution and the mixture can separate forming two distinct liquid fractions. In some embodiments, the mixture can be heated to encourage solvation of the lignin and separation of the mixture into two liquid fractions. The particular temperature utilized for any system can vary, with a preferred temperature generally depending upon the components of the solvent solution and the lignin content of the system. For instance, separation and fractionation can occur in a 10% lignin mixture and a 25% lignin mixture at various combinations of temperature and solvent solution composition. The pressure of the system can be maintained at atmospheric until the temperature approaches the lower of the boiling point of the fractions, but as mentioned above, it may be beneficial to increase pressure at higher temperatures to avoid vaporization of any of the components of the system.

In those embodiments in which the mixture is heated to promote the liquid fraction formation, a mixture can be heated to a temperature of about 30° C. or greater, about 50° C. or greater, about 70° C. or greater, or about 90° C. or greater in some embodiments to fully solvate the lignin and obtain a phase separation of the mixture into two liquid phases. In any case, the temperature and optionally the pressure can be raised as necessary such that both phases contain liquids beneath vaporization conditions. The upper limit of the temperature is not particularly limited and can be, for instance, about 300° C. or less, about 250° C. or less, about 200° C. or less, about 150° C. or less or about 100° C. or less in some embodiments, with the pressure being increased as needed to prevent evaporation of any of the solvent components so that both liquid phases are kept intact.

Referring again to FIG. 1, the two phases that can be formed upon combination of the lignin feedstock and the solvent solution can include a lignin-rich phase 16 and a solvent-rich phase 14. The solvent-rich phase 14 can include lower molecular weight lignin as compared to the lignin-rich phase 16. For instance, following a single-stage separation of a lignin-containing feedstock that contains a relatively wide molecular weight range of lignin, the solvent-rich phase 14 can include a relatively higher proportion of low molecular weight and very low molecular weight lignin and the lignin-rich phase 16 can include a relatively higher proportion of mid-range molecular weight and high molecular weight lignin. In addition, the lignin-rich phase 16 can generally be lower in impurities as compared to the solvent-rich phase 14. For instance, following a single-stage separation, and depending upon the characteristics of the lignin-containing feedstock, the lignin-rich phase 16 can contain about 1 wt. % or less ash and a total metals content of about 500 ppm or less. In one embodiment, following a single-stage separation, the solvent-rich phase 14 can have a sodium content of about 500 ppm or less, or about 250 ppm or less in some embodiments.

Additional separation stages can be employed to further separate lignin from other components of the feedstock according to one or more characteristics, for instance with regard to molecular weight and molecular weight distribution of the lignin as well as with regard to impurity removal from the lignin. Beneficially, through utilization of multiple separation stages, a purified lignin can be recovered having a narrow molecular weight distribution and/or a low impurities content. For instance, a purified lignin obtained through one or more separation stages can have a total metals content of about 75 ppm or less, a sodium content of about 25 ppm or less. A purified lignin obtained through one or more separation stages can have an ash content of about 0.5 wt. % or less, 0.3 wt. % or less, 0.1 wt. % or less, or 0.08 wt. % or less in some embodiments.

Through selection of the number of stages, the temperature of each stage, the components of the solvent solution of each stage, and the component ratio of the solvent solutions in each stage, the overall process can be 'tuned' to provide a purified lignin of a predetermined molecular weight having a narrow molecular weight distribution. The predetermined molecular weight can be quite broad, for instance encompassing the majority of the high molecular weight lignin included in a feedstock or the majority of the low and very low molecular weight lignin included in a feedstock, or can be very tightly defined, for instance providing lignin of a fairly specific molecular weight with the molecular weight of the product having a narrow size distribution.

Figure 2:
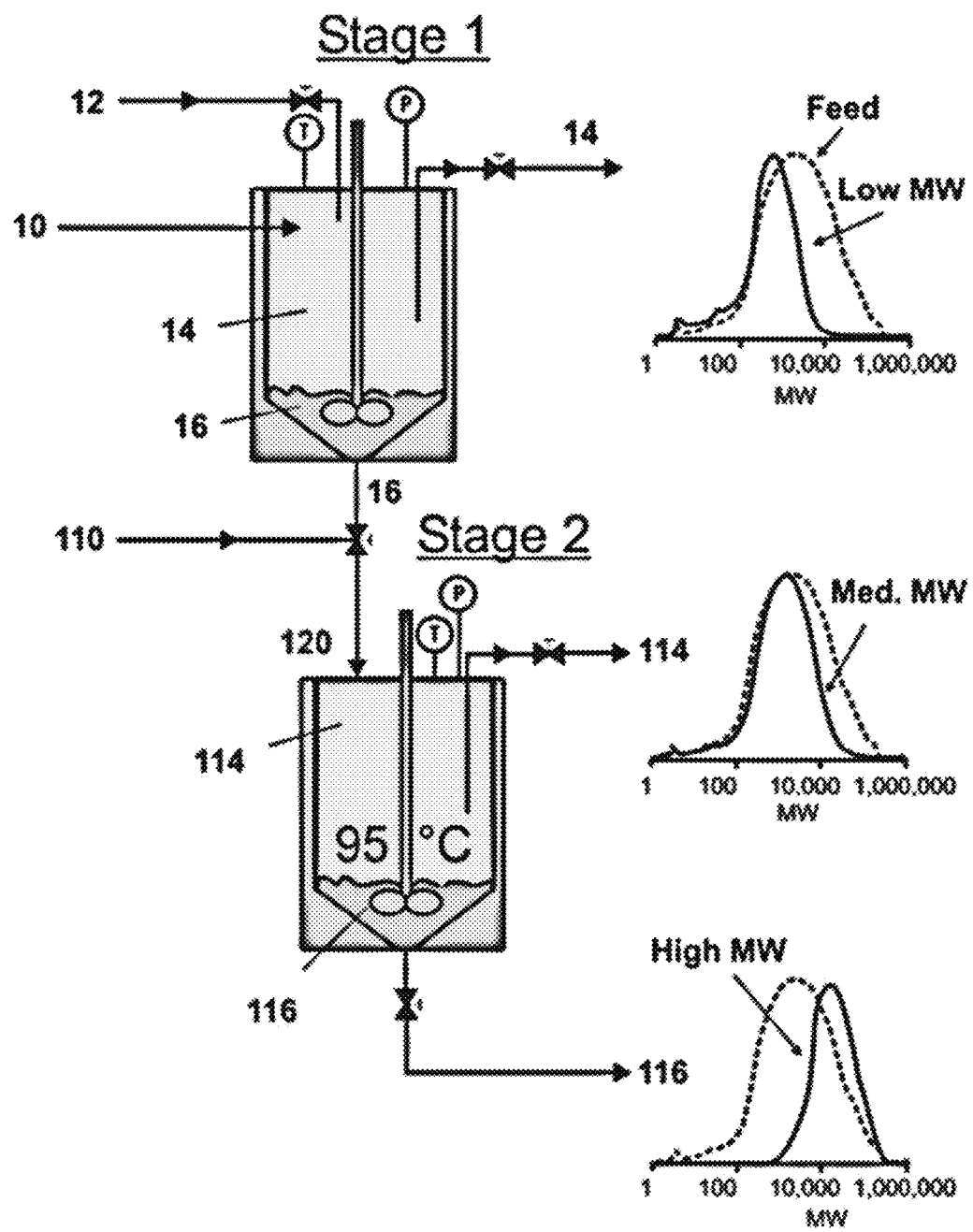
FIG. 2 is flow diagram for one embodiment of a two-stage recovery process.

As stated, this tuning and targeting of the product can be accomplished through utilization of multiple separation stages in a purification process. FIG. 2 illustrates a two-stage separation as an example. In this embodiment, the first stage of the process can be similar to that as illustrated in FIG. 1, in which a lignin-containing feedstock 10 and a solvent solution 12 are fed to the separation stage. Upon mixing and optional heating, lignin of the feedstock can be solvated in the mixture and the mixture can fractionate to form a first solvent-rich phase 14 and a second lignin-rich phase 16. In this two-stage embodiment, the solvent-rich phase 14 can be pulled off of the system and can provide a high proportion of low and very low molecular weight lignin as described. This solvent-rich phase 14 can contain a high proportion of the impurities of the feedstock, and lignin contained in this stream 14 can be separated from the impurities by further processing, as described further herein.

The lignin-rich phase 16 can be removed from the first stage and utilized as a feedstock for a second stage. For instance, the lignin-rich phase 16 can be combined with a second solvent solution 110 to form a second mixture 120. The second solvent solution can be the same or different as the first solvent solution 12 of the first stage, though in general, it will differ so as to provide a distinct second lignin separation in the second stage, rather than a repeat of the separation of the first stage. For instance, the second solvent solution 110 can vary from the first solvent solution with regard to solvent solution component ratio to initiate the formation of a second phase. In one embodiment, a second stage separation of the lignin-rich phase can utilize a solvent solution with a higher proportion of organic acid as compared to the solvent solution utilized in the first stage. In a second stage separation, the second mixture can be optionally heated and stirred to encourage the formation of a third solvent-rich phase 114 and a fourth lignin-rich phase 116. As with the first stage, the solvent-rich phase 114 can include a higher proportion of the lower molecular weight lignin of the lignin-containing feed 16 and the lignin-rich phase 116 can include a higher proportion of the higher molecular weight lignin of the lignin-containing feed 16. In addition, impurities contained in the lignin-containing feed 16 to the second stage can preferentially be extracted into the solvent-rich phase 114 of this second stage separation.

The product streams 114, 116 of the second stage can provide product lignin of a desired molecular weight and impurity levels, or can be further treated with additional stages, as desired. In general, the lignin-rich phase of a separation stage can include lower levels of metal impurities as compared to the solvent-rich phase. For example, the lignin of the final lignin-rich phase of a multi-stage purification process can have a sodium content of about 50 ppm or less, about 40 ppm or less, or about 20 ppm or less. Similarly low metals content can be obtained from a solvent-rich phase through separation of the lignin from the solution in which the impurities can dissolve. For instance, by precipitating the lignin of a solvent-rich phase (for instance with a solvent solution containing a low amount of organic acid), the recovered lignin can be very low in impurities similar to the solvated lignin of a lignin-rich phase. The recovered lignin can be provided as a liquid or solid depending on temperature and solvent solution concentration.

Figure 3:
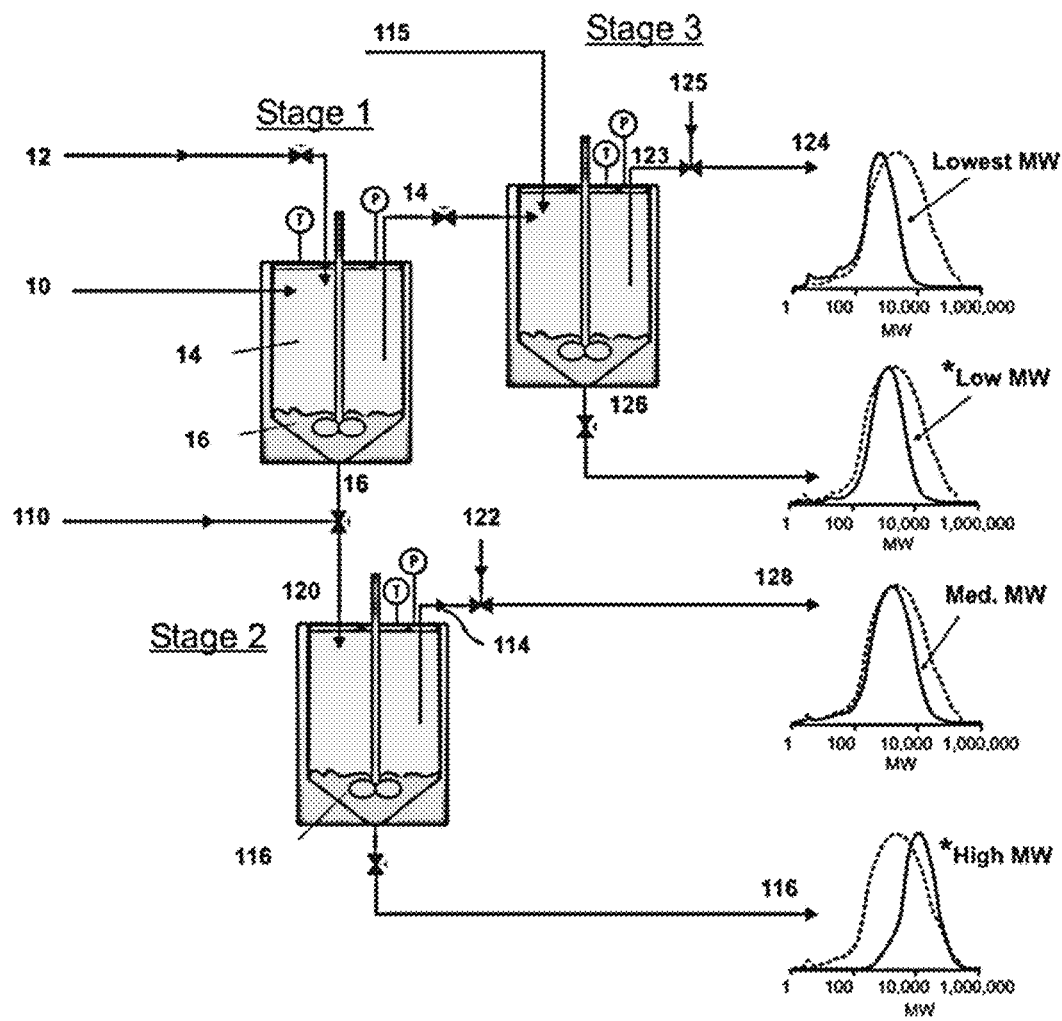
FIG. 3 is a flow diagram for one embodiment of a three-stage recovery process.

Additional separation stages can be included in a process as desired. For example, FIG. 3 illustrates a three-stage recovery/purification process. In this embodiment, the solvent-rich phase 14 of the first stage of the process can be fed to a third stage as the lignin-containing lignocellulosic biomass feedstock for this stage. The solvent-rich phase 14 can be combined with a solvent solution 115 and optionally heated to form a solvent-rich phase 123 and a lignin-rich phase 126. In one embodiment, the solvent solution 115 utilized to process the solvent-rich phase of a previous stage can include a lower amount of the organic acid component as compared to that of the previous stage, so as to further separate the lignin of the stage feedstock.

The lignin contained in the solvent-rich phase 14 fed to the third stage can be split in the third stage. For instance, the solvent-rich phase 14 can include the lower molecular weight lignin of the original lignin-containing feedstock 10, and this lower molecular weight lignin can be split again in this third phase such that the solvent-rich phase 123 of this third stage can include the lower molecular weight lignin of that contained in the solvent-rich phase 14 fed to the third stage, for instance the very low molecular weight lignin of the original feedstock 10, and the lignin-rich phase 126 of this third stage can include the higher molecular weight lignin of that contained in the solvent-rich phase 14 to the third stage, for instance the low molecular weight lignin of the original feedstock 10.

Optionally, one or more of the streams pulled off of a separation stage(s) can be further treated, for instance to precipitate the lignin from the stream. For instance, by contacting a solvent-rich phase with a treatment solution that includes a high percentage of water at ambient temperature, for example from about 50% to 100% water by weight, with any remainder component of the treatment solution being an organic acid, the recovered solid lignin phase can have a very low impurity level, such as about 40 ppm sodium or even less in some embodiments. As exemplified in the embodiment of FIG. 3, the solvent-rich stream 123 of the third stage and the solvent-rich stream 114 of the second stage can be combined with a precipitant, e.g., 50%-100% water in streams 125 and 122, respectively, that can precipitate the lignin of the stream as a solid or a liquid purified lignin 124, 128 of a predetermined molecular weight having a narrow molecular weight distribution and a very low level of impurities.

Additional separation stages can be developed to provide a lignin with a very well defined molecular weight and an even lower content of impurities. The phases should ideally remain as liquid throughout all stages of the separation, with any lignin solidification occurring after a final separation/purification stage. In general, precipitation can be carried out with a precipitant (e.g., about 50-100% water) added following a final separation stage.

The lignin recovered according to a process can be utilized in any desired processing technique to provide a value-added product. For instance, the recovered lignin can be utilized to form high-value polymers such as a polymeric fiber, for instance polymeric fibers that can be further treated to form carbon fibers. Purified lignin provided by use of the disclosed methods can also be utilized to provide raw material to form polymers or non-polymeric chemicals via transformation of the lignin polymers according to standard methodology. Alternatively, the high-purity lignin can be used as is, optionally in conjunction with other more traditional polymers, to form a polymeric composition of use in forming coatings (e.g., primers, paints, etc.), fibers, thin films, molded products (injection molding, blow molding, thermoforming, etc.), and so forth.

The present invention may be better understood with reference to the Examples, set forth below.

Example 1

10.0 g of a solid, particulate feed kraft lignin with a sodium (Na) content of 1400 ppm and an ash content of 2 wt % was combined in a vessel with 78.3 g of a 50/50 by weight mixture of acetic acid (AcOH) and water ($H_2O$), similar to that illustrated as Stage 1 in FIG. 2. The vessel was brought up to 95° C. with stirring. Upon reaching temperature, the lignin had melted and spontaneously formed a heavier, lignin-rich liquid phase in the bottom of the vessel, leaving a lighter, solvent-rich phase in the top. Analysis of the lignin-rich phase showed that it contained 4.6 g of lignin on a dry basis, was reduced in Na down to about 175 ppm, and contained significant amounts of solvent—50-70% by weight.

The lignin-rich bottom phase from Stage 1 was then delivered to Stage 2 as illustrated in FIG. 2, where it was contacted with 36.7 g of 70/30 AcOH/$H_2O$ in another vessel at 95° C. with stirring; once again, two liquid phases, a solvent-rich and a lignin-rich liquid phase, were formed. (A solvent mixture higher in acetic acid was utilized so as to split this higher molecular weight (MW) fraction of the lignin into two phases.) The lignin-rich phase was highly "solvated", containing 68% solvent by weight such that it could be readily processed into artifacts. Upon drying, this lignin-containing stream (stream 116 of FIG. 2) was found to have a mass of 3 g, contained only 25 ppm Na with a Na+K level of <100 ppm, and contained <0.10% ash. Attempts to dissolve it in a GPC solvent were unsuccessful, so it was surmised that it was a high molecular weight fraction of the lignin. The expected GPC chromatogram of this fraction is shown in FIG. 2 and compared to the molecular weight of the feedstock lignin (the dotted line).

The solvent-rich phase from Stage 2 (FIG. 3, stream 114) was contacted with 70 g of water (FIG. 3, stream 122) at ambient temperatures, and 1.6 g of solid lignin containing only 40 ppm of Na was obtained. This fraction was soluble in the GPC solvent and was analyzed for molecular weight; the GPC chromatogram is shown in FIG. 2 and FIG. 3 and is compared to the molecular weight of the feedstock lignin (the dotted line).

Example 2

10.0 g of a solid, particulate feed kraft lignin with sodium (Na) content of 1400 ppm and an ash content of 2% was combined in a vessel with 89.9 g of a 70/30 by weight mixture of AcOH/$H_2O$, see Stage 1 in FIG. 3. The vessel was brought up to 95° C. with stirring. Upon reaching temperature, the lignin had melted and spontaneously formed a heavier, lignin-rich liquid phase in the bottom of the vessel, leaving the lighter, solvent-rich phase in the top. Analysis of the lignin-rich phase showed that it was reduced in Na down to 280 ppm and contained significant amounts of solvent, for example, 50-70% by weight.

The solvent-rich phase from Stage 1 was then delivered to Stage 3 as illustrated in FIG. 3 where it was contacted with 7.0 g of distilled/deionized water at 95° C. to adjust the overall solvent composition of the mixture to 65% acetic acid. Once again, two liquid phases, a solvent-rich phase and a lignin-rich phase, were formed. Upon analysis after drying, the lignin-rich phase was found to weigh 1.6 g, contain 110 ppm Na, and have a lower molecular weight.

The above process of carrying over the solvent-rich phase from each stage to the next and adding distilled/deionized water to adjust the solvent composition and thus form the next lignin-rich liquid fraction was repeated for a total of 6 stages, after which most of the lignin had been recovered. Each consecutive stage showed a lower average molecular weight by GPC, and the final product contained 90 ppm Na and 30 ppm potassium (K). In this way, a series of narrow molecular weight fractions of low number average molecular weight and reduced metals content can be made, with the last sample having the lowest number average molecular weight.

Example 3

160 g of a solid, particulate, wet kraft softwood lignin (kraft softwood 1 in Table I) with a sodium (Na) content of 1400 ppm and an ash content of 2% was combined in a vessel with 240 g of distilled/deionized water and blended to form a slurry with a batter-like consistency consisting of about 50% lignin and 50% water. This mixture was used as a feed to a progressive cavity pump and was pumped at a flow rate of 5 mL/min into a static mixer as illustrated in FIG. 4. At the same time, 400 g of distilled/deionized water was combined with 600 g of glacial acetic acid in a separate vessel to create a solvent solution that was pumped at a flow rate of 15 mL/min into the static mixer, as illustrated. The static mixer was 11.5 inches in length, had an inner diameter of 0.194 inches, and had 34 mixing elements. The outlet stream from the static mixer was maintained at 80° C. by heating of the static mixer with heating tape, in order that the feed lignin might melt in the presence of the solvent solution and form the desired two liquid phases, consisting of a lighter solvent-rich phase and a heavier lignin-rich phase. The two phases were easily separated with a screen filter at the outlet of the static mixer. On a dry basis, the flow rate of lignin in each phase was about 1 g/min. Analysis of the lignin-rich phase showed that it was reduced in Na down to 60 ppm and contained 50-70% solvent by weight. The molecular weight of the high molecular weight fraction was shown to be greater than that of the starting material, and the molecular weight of the low molecular weight fraction was shown to be lower than that of the starting material. Shown in Table I below are results from similar static mixer runs using three different lignin-containing feedstocks, including two kraft softwood lignins and an organsolv lignin. Significant reductions in metals content were obtained in all cases.

TABLE I

| Lignin sample | Starting material metals content (ppm) | | Processed material metals content (ppm) | |
| --- | --- | --- | --- | --- |
| | K | Na | K | Na |
| kraft softwood 1 | 310 | 1400 | 35 | 60 |
| kraft softwood 2 | 570 | 7160 | 50 | 570 |
| organosolv | 110 | 15 | 20 | 5 |

Example 4

A low molecular weight lignin fraction was obtained using the setup shown in FIG. 3. In particular, a 50/50 AcOH/$H_2O$ stream solvent solution was combined with 10 g of a lignin-containing feedstock, generating a lignin-rich phase stream and a solvent-rich phase stream. The solvent-rich stream was then contacted with a second solvent stream, which consisted of water, forming a second lignin-rich phase stream and a second solvent-rich phase stream. This second solvent-rich phase stream was then dried and recovered. Approximately 0.25 grams of this low molecular weight lignin stream with a PDI of 2 and a number average molecular weight of 640 by GPC was heated on a melting-point hot plate. The solvent-free lignin sample melted at 65° C. and became liquid-like. Tweezers were used to draw thin filaments of the lignin sample approximately 2 feet long with an approximate diameter of 10 micrometers. The filaments were flexible and could be manipulated like a hair.

Prophetic Example 1

From the above example, one can also readily conceptualize a process for producing a low MW lignin fraction that is purified down to less than 150 ppm Na+K and less than 0.20% ash. An exemplary process is depicted in FIG. 3. The solvent-rich phase from Stage 1 and a 30/70 AcOH/$H_2O$ solvent mixture can be fed and processed at 95° C. in Stage 3. (A weaker solvent mixture can be utilized to split the lower mol wt. fraction of lignin into two liquid phases.) The contents can be heated to, e.g., 95° C. and two liquid phases form as described. The bottom, lignin-rich phase is solvated and is a low MW fraction of the lignin that is purified down to 100 ppm Na and also very low levels of K and ash as above. The solvent-rich phase can be contacted with water in order to precipitate out the lignin and also to extract out the metal salts; thus, this lignin product (FIG. 3, stream 124) can also be ultrapure and can include a very low MW fraction of the lignin.

It will be appreciated that the foregoing examples, given for purposes of illustration, are not to be construed as limiting the scope of this disclosure. Although only a few exemplary embodiments of the disclosed subject matter have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A method for recovering lignin comprising:
    combining a pretreated lignocellulosic biomass feedstock containing lignin with a single phase solvent solution to form a mixture, the single phase solvent solution comprising a solvent selected from water, a $C_1$ to $C_4$ organic acid, an aliphatic alcohol, a ketone, or a combination thereof;
    stirring and optionally heating the mixture;
    following the combination and optional heating, the lignin solvating into the single-phase solvent solution and the mixture separating into a solvent-rich liquid phase and a lignin-rich liquid phase, wherein the solvent-rich liquid phase comprises a first portion of the solvated lignin in a liquid form and a first portion of the solvent and the lignin-rich liquid phase comprises a second portion of the solvated lignin in a liquid form and a second portion of the solvent, the solvated lignin of the first portion differing from the solvated lignin of the second portion, the second portion of the solvent being from 50% to 70% by weight of the lignin-rich liquid phase, the ratio of the first portion of the solvent to the first portion of the solvated lignin being greater than the ratio of the second portion of the solvent to the second portion of the solvated lignin;
    separating the solvent-rich liquid phase from the lignin-rich liquid phase; and
    recovering the solvated lignin of the solvent-rich liquid phase and/or the solvated lignin of the lignin-rich liquid phase.

2. The method of claim 1, wherein the average number average molecular weight of the first portion of the lignin differs from the average number average molecular weight of the second portion of the lignin.

3. The method of claim 1, further comprising one or more additional stages during which a lignin-containing stream from a previous stage is combined with another solvent solution to form a mixture and wherein upon this combination optionally with heating the mixture separates to form another solvent-rich liquid phase and another lignin-rich liquid phase.

4. A method for recovering lignin comprising:
   combining a pretreated lignocellulosic biomass feedstock containing lignin and one or more additional components with a single phase solvent solution to form a mixture, the single phase solvent solution including water and a solvent, wherein the solvent comprises a $C_1$ to $C_4$ organic acid, an aliphatic alcohol, a ketone, or a combination thereof;
   stirring and heating the mixture to a temperature of about 50° C. or greater;
   following the combination, stirring and heating, the lignin solvating into the solvent solution and the mixture separating into a solvent-rich liquid phase and a lignin-rich liquid phase, wherein the solvent-rich liquid phase comprises a first portion of the lignin as solvated lignin in a liquid form and the lignin-rich liquid phase comprises a second portion of the lignin as solvated lignin in a liquid form, each of the solvent-rich liquid phase and the lignin-rich liquid phase comprising water, the solvent and one or more components of the lignocellulosic biomass feedstock, the solvated lignin of the solvent-rich liquid phase differing from the solvated lignin of the lignin-rich liquid phase;
   separating the solvent-rich liquid phase from the lignin-rich liquid phase; and
   recovering the solvated lignin of the solvent-rich liquid phase and/or the solvated lignin of the lignin-rich liquid phase.

5. The method of claim 4, wherein the solvent comprises acetic acid.

6. The method of claim 4, wherein the solvent comprises a ketone.

7. The method of claim 4, wherein the average number average molecular weight of the first portion of the lignin differs from the average number average molecular weight of the second portion of the lignin.

8. The method of claim 4, wherein the first portion of the lignin and/or the second portion of the lignin have a narrower molecular weight distribution as compared to the molecular weight distribution of the lignin of the pretreated lignocellulosic biomass feedstock.

9. The method of claim 4, the pretreated lignocellulosic biomass feedstock comprising metal, the metals content of the solvent-rich liquid phase differing from the metals content of the lignin-rich liquid phase.

10. The method of claim 9, the lignin-rich liquid phase comprising 50% or less by weight of the metal of the pretreated lignocellulosic biomass feedstock.

11. The method of claim 4, the pretreated lignocellulosic biomass feedstock having an ash content, the ash content of the solvent-rich liquid phase differing from the ash content of the lignin-rich liquid phase.

* * * * *